US008444246B2

(12) United States Patent
Muro et al.

(10) Patent No.: US 8,444,246 B2
(45) Date of Patent: May 21, 2013

(54) INKJET PRINTING APPARATUS AND CALIBRATION METHOD

(75) Inventors: Kentarou Muro, Tokyo (JP); Susumu Hirosawa, Tokyo (JP); Yutaka Kano, Yokohama (JP); Shigeyasu Nagoshi, Yokohama (JP); Minoru Teshigawara, Saitama (JP); Yoshiaki Murayama, Tokyo (JP); Takeshi Murase, Yokohama (JP); Satoshi Azuma, Kawasaki (JP); Masao Kato, Kawasaki (JP); Minako Kato, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 230 days.

(21) Appl. No.: 12/964,109

(22) Filed: Dec. 9, 2010

(65) Prior Publication Data

US 2011/0279612 A1 Nov. 17, 2011

(30) Foreign Application Priority Data

May 17, 2010 (JP) ................................ 2010-113209

(51) Int. Cl.

| | |
|---|---|
| ***B41J 29/393*** | (2006.01) |
| *B41J 2/01* | (2006.01) |
| *B41F 35/00* | (2006.01) |
| *B41L 41/00* | (2006.01) |
| *G03G 15/00* | (2006.01) |
| *G03G 15/11* | (2006.01) |
| *G03G 21/20* | (2006.01) |
| *G06F 15/00* | (2006.01) |
| *G06K 1/00* | (2006.01) |

(52) U.S. Cl.
USPC ................ 347/19; 347/102; 399/72; 399/97; 399/251; 101/424.1; 358/1.9

(58) Field of Classification Search .................. 347/102, 347/19; 34/446, 474, 483, 491; 399/72, 97, 399/251; 101/424.1; 358/1.9
See application file for complete search history.

(56) References Cited

U.S. PATENT DOCUMENTS

| | | | | |
|---|---|---|---|---|
| 6,094,560 | A * | 7/2000 | Thomas | 399/341 |
| 6,097,925 | A * | 8/2000 | Nagaoka et al. | 399/316 |
| 6,259,887 | B1 * | 7/2001 | Awano | 399/390 |
| 6,761,426 | B2 | 7/2004 | Tsuchiya et al. | |
| 7,978,367 | B2 * | 7/2011 | Matsuzawa et al. | 358/1.9 |
| 2008/0231874 | A1 | 9/2008 | Matsuzawa et al. | |
| 2011/0063358 | A1 | 3/2011 | Muro et al. | |
| 2011/0109710 | A1 * | 5/2011 | Miyakoshi et al. | 347/104 |
| 2011/0273503 | A1 * | 11/2011 | Azuma et al. | 347/14 |
| 2011/0279832 | A1 * | 11/2011 | Muro et al. | 358/1.9 |

FOREIGN PATENT DOCUMENTS

| | | |
|---|---|---|
| JP | 10-268589 A | 10/1998 |
| JP | 2008-102719 A | 5/2008 |

* cited by examiner

*Primary Examiner* — Stephen Meier
*Assistant Examiner* — Jeremy Bishop
(74) *Attorney, Agent, or Firm* — Fitzpatrick, Cella, Harper & Scinto

(57) ABSTRACT

An apparatus includes: a drying unit to dry a printing medium on which an image was printed using an inkjet head; a humidification unit to humidify the printing medium that was dried by the drying unit so that the moisture content of the printing medium becomes the equilibrium state in the ambient environment; a colorimetric unit to perform colorimetry on the printing medium that was humidified by the humidification unit; and a calibration unit to calibrate printing properties on the basis of the result of colorimetry by the colorimetric unit.

8 Claims, 6 Drawing Sheets

STATE WHERE CARRYING ROLLERS CONTACT PRINT MEDIUM

STATE WHERE CARRYING ROLLERS ARE APART FROM PRINT MEDIUM

STATE WHERE CARRYING ROLLERS CONTACT PRINT MEDIUM

STATE WHERE CARRYING ROLLERS ARE APART FROM PRINT MEDIUM

INKJET PRINTING APPARATUS AND CALIBRATION METHOD

BACKGROUND OF THE INVENTION

1. Field of the Invention

The present invention relates to an inkjet printing apparatus and a calibration method thereof, specifically, an art to measure an image in which the color and density of an image printed with ink is measured and printing properties in the printing apparatus are calibrated on the basis of the measured result.

2. Description of the Related Art

In performing calibration, first, an image to be measured is printed. A printing medium on which this image to be measured was printed, changes its color dramatically between immediately after printing and after drying and fixing, due to change of moisture content of the printing medium. Accordingly, it is preferable that in performing calibration, colorimetry is performed on the printing medium in its final state, that is, a state where the printing medium has been dried and the color has been stabilized. In doing so, since natural air drying takes much time, a drying unit is often used to perform forced drying such as spraying the printing medium with hot air and using radiation heating or conduction heating means in order to reduce drying treatment time (see, e.g. Japanese Patent Laid-Open No. 2008-102719).

SUMMARY OF THE INVENTION

If a printing medium is dried by such a forced drying unit, it is preferable that conditions such as a drying treatment time and a drying temperature have some margin in order to secure a sufficient drying capacity, considering a design tolerance of a drying apparatus. Each of a plurality of images to be measured that were printed on the printing medium may have a different ink feed amount; and accordingly sufficient drying may be performed for all of the images to be measured in order to eliminate a difference of dryness among the images. In such a case, the printing medium often becomes overdry immediately after drying. In the case of an overdry state, that is, in the case where the moisture content of the printing medium is less than the equilibrium moisture amount in the environment after drying, the printing medium absorbs moisture in the air and the moisture content increases until the moisture content becomes the equilibrium amount. As the moisture content is increasing, the color of the printing medium is changing. In order to perform the aforementioned colorimetry in a state where the color of the printing medium is stabilized, after drying, the colorimetry may not be started until the moisture content becomes the equilibrium amount (e.g. for a few minutes), but this is not preferable since the treatment time becomes longer.

In a apparatus or a method in which a printing medium printed by a printing apparatus is forcedly dried, an image is read, and calibration is performed, the present invention is intended to reduce a time period between a completion of drying and starting colorimetry, as well as enabling colorimetry to be performed in a state where the color of the printing medium is stabilized.

An aspect according to the present invention is an apparatus including:

a printing unit having an inkjet head; drying unit to dry a printing medium on which an image was printed using the inkjet head;

a humidification unit to humidify the printing medium dried by the drying unit;

a colorimetric unit to perform colorimetry on the image of the printing medium humidified by the humidification unit; and a calibration unit to calibrate printing properties for printing with the inkjet head, on the basis of the result of colorimetry by the colorimetric unit.

The present invention provides an apparatus and a method in which a printing medium can be forcedly dried, a color of an image of the printing medium can be stabilized in a short time, and colorimetry can be performed in a state where the color is stabilized.

Further features of the present invention will become apparent from the following description of exemplary embodiments (with reference to the attached drawings).

DESCRIPTION OF THE EMBODIMENTS

Embodiments of the present invention will be described below with reference to the drawings.

First Embodiment

Figure 1:
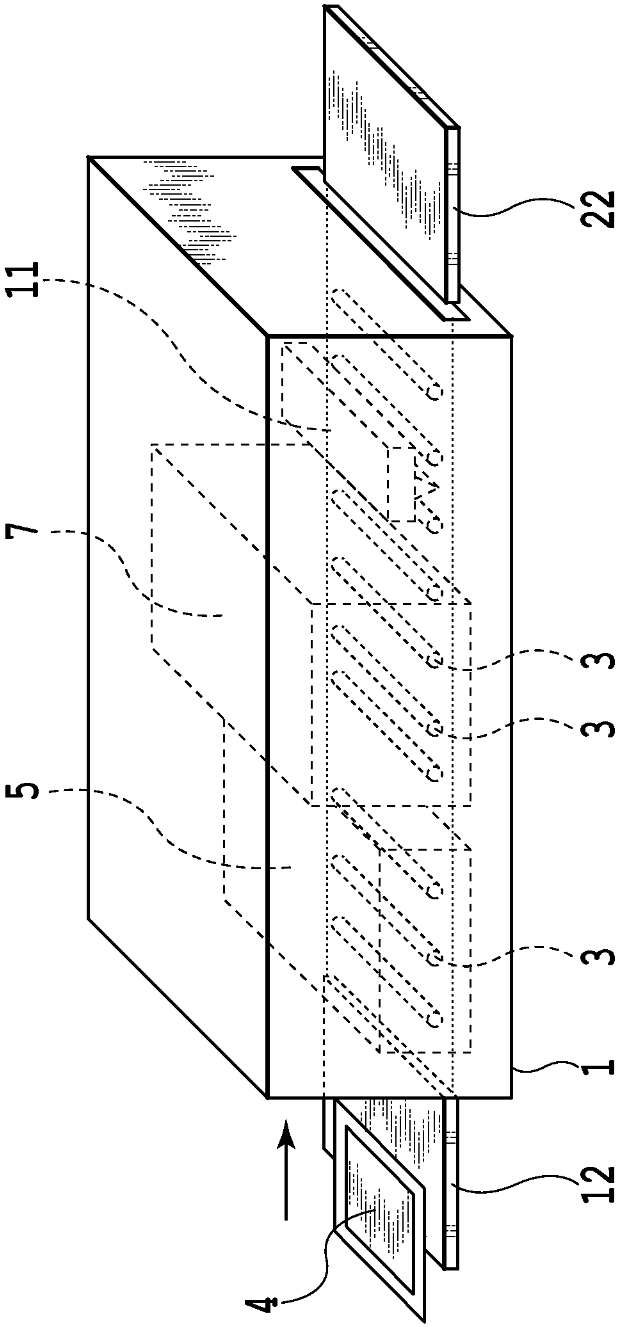
FIG. 1 is a schematic perspective view illustrating a configuration of an inkjet printing apparatus according to a first embodiment of the present invention.
Figure 2:
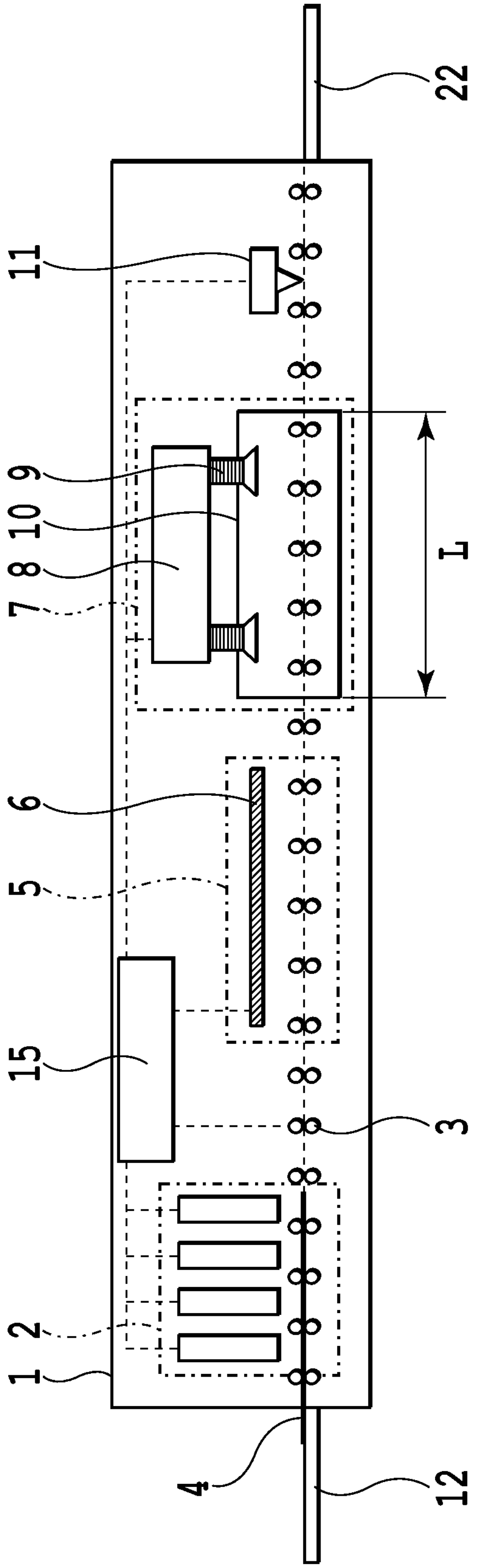
FIG. 2 is a schematic elevation view illustrating the configuration of the inkjet printing apparatus according to the first embodiment of the present invention.

FIGS. 1 and 2 are a schematic perspective view and a schematic elevation view illustrating a configuration of an inkjet printing apparatus according to a first embodiment of the present invention, respectively. An inkjet printing apparatus 1 according to the first embodiment includes: a drying treatment unit 5 to dry a printing medium 4 on which an image was printed; a humidification treatment unit 7 to humidify the dried printing medium; and a colorimetric unit 11 to perform colorimetry on the humidified printing medium. In this example, the inkjet printing apparatus 1 includes a carrying mechanism 3 to carry the printing medium 4 within the inkjet printing apparatus. The inkjet printing apparatus 1 further includes: a paper feeding unit 12 to support the printing medium 4 that is fed into the inkjet printing apparatus 1; and a paper ejecting unit 22 to support the printing medium 4 that is discharged from the inkjet printing apparatus 1. In FIG. 2, a printing unit 2 is a unit for printing an image on the printing medium 4. A control unit 15 (main controller) is a unit that is connected to each of the printing unit 2, carrying mechanism 3, drying treatment unit 5, humidification treatment unit 7 and colorimetric unit 11 to control each unit or mechanism, according to need. In FIG. 1, the printing unit 2 and control unit 15 are not shown. The printing unit 2 has a plurality of print heads. The plurality of print heads can discharge cyan, magenta, yellow and black inks. Each of the print heads is a fixed full-line type inkjet head on which a nozzle is formed to discharge ink over the maximum printing width in the width direction of a sheet. An inkjet method in this example employs a heating element, but is not limited to this type; the method using a piezo element, an electrostatic element or an MEMS element is applicable. In implementing the present invention, it should be appreciated that a type of a print head and the number of colors of inks and the types of inks are not limited to the aforementioned example.

The drying treatment unit 5 includes a drying unit to dry the printing medium 4. As the drying unit, heating means to forcedly dry the printing medium 4 can be used, such as means for spraying the printing medium 4 with hot air, radiation heating means, and conduction heating means. In this example, a heater 6 is used as the drying unit, by way of example.

The humidification treatment unit 7 includes a humidification unit that has a humidification space whose atmosphere has a higher humidity than that of the ambient environment. The humidification treatment unit 7 can be disposed downstream of the drying treatment unit 5. In this example, the humidification unit includes a humidified air generator 8, a humidification duct 9 and a chamber 10 that is the humidification space by way of example, and a humidified air generated by the humidified air generator 8 is sent through the humidification duct 9 into the chamber 10. The humidity of the atmosphere within the chamber 10 can be kept higher than that of the ambient environment. Humidification of the printing medium 4 in the chamber 10 by the humidification treatment unit 7 can be controlled by a humidity within the chamber 10 and a time period during which the printing medium 4 is within the chamber 10. That is, the humidity and time period of the humidification treatment make a moisture content of the printing medium to the equilibrium state where the moisture content does not change in relation to the ambient environment.

The colorimetric unit 11 is connected to the control unit 15 (calibration unit) that processes data that was subject to colorimetry, and after that performs calibration such that a color is corrected to be printed on the printing medium. An example of calibration of the control unit 15 includes generating or changing a parameter of image processing such as gamma correction on image data of an image to be printed. For example, if a measured result is lower than an ideal density range, an image processing parameter is generated or changed so as to increase the density of the image data. Other calibrations may include generating or reconfiguring a control parameter of a print head. Examples of this control parameter of the print head, which is used for such as reconfiguration, include parameters such as a pulse energy applied to an energy generation element of a nozzle when ink is discharged and a control temperature of a print head. The present invention is not limited to a calibration form. These various calibrations are generically called as "calibration of printing properties" here.

The colorimetric unit 11 can be disposed downstream of the humidification treatment unit 7. In this example, a scanner is used as a colorimetric unit of the colorimetric unit 11, by way of example. The scanner is disposed at the position opposite to a surface to be subject to colorimetry (colorimetric surface) of the printing medium 4, and measures a color of the colorimetric surface. It is preferable that the scanner has a linear structure so as to simultaneously perform colorimetry on the width direction that is orthogonal to a carrying direction of the printing medium 4.

The carrying mechanism 3 is a mechanism to carry the printing medium 4 to the drying treatment unit 5, humidification treatment unit 7 and colorimetric unit 11, in this order. A carrying speed V of the printing medium 4 by the carrying mechanism 3 may or may not be the same in each of the units 5, 7 and 11 within the inkjet printing apparatus 1. For example, a suitable different speed may be set to each of the units so that a speed in the drying treatment unit 5 is V1, a speed in the humidification treatment unit 7 is V2, and a speed in the colorimetric unit 11 is V3. In this example, a plurality of carrying rollers disposed on and under the printing medium 4 are used as the carrying mechanism 3 by way of example. The plurality of carrying rollers are controlled by control means, hold the printing medium 4 between each of them in a vertical direction and rotate in itself, thereby carrying the printing medium 4 to each of the units.

The control unit 15 performs control so that the printing medium 4 is dried in the drying unit of the drying treatment unit 5, is humidified in the humidification unit of the humidification treatment unit 7 for a predetermined time period, and then is subject to colorimetry in the colorimetric unit of the colorimetric unit 11. The printing medium 4 may be a sheet on which an image can be printed by an inkjet printing method, such as a sheet of paper, substrate or plastic.

Figure 3:
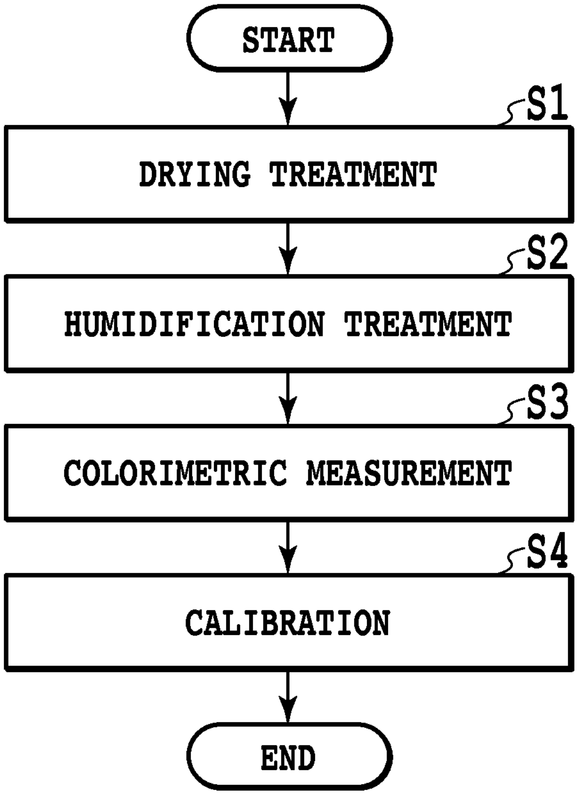
FIG. 3 is a flow chart illustrating treatments of a printing medium in an inkjet printing apparatus of the present invention.

Next, an operation example of the inkjet printing apparatus 1 according to the present embodiment will be described with reference to FIG. 2. The printing medium 4 on which an image has not been printed yet is fed from the paper feeding unit 12 into the inkjet printing apparatus 1, and an image is printed on the printing medium by printing means of the printing unit 2. Next, the printing medium 4 on which an image was printed is held between each of the plurality of carrying rollers disposed on and under the printing medium 4, is carried by rolling of the carrying rollers through each of the units 5, 7 and 11 in this order, and is discharged from the paper discharging unit 22 to the outside of the inkjet printing apparatus 1. Treatment procedures of the printing medium 4 in each of the drying treatment unit 5, humidification treatment unit 7, colorimetric unit 11 and control unit 15 (calibration unit) will be described in detail, with reference to FIGS. 2 and 3.

The printing medium 4 on which an image was printed is subject to a heat-drying treatment by the heater 6 as the drying unit in the drying treatment unit 5 (Step S1). After the heat-drying treatment (S1), the printing medium 4 is in an overdry state, that is, a state where its moisture content is lower than the equilibrium moisture content in a temperature of the ambient environment.

Next, the printing medium 4 in an overdry state is disposed within the humidification space whose atmosphere has a higher humidity than that of the ambient environment to be exposed to the atmosphere with a higher humidity, thereby absorbing moisture in the humidification treatment unit 7 (Step S2). The humidification treatment (S2) is performed until the moisture content of the printing medium 4 reaches the equilibrium state in the ambient environment. In this specification, an expression of "reach the equilibrium state" or "become the equilibrium state" is not limited to reaching the complete equilibrium state, but includes becoming nearly the equilibrium state.

Next, the humidified printing medium 4 is subject to colorimetry by the scanner as the calorimetric unit in the colorimetric unit 11 (Step S3).

Then, in the control unit 15, printing properties are subject to calibration for performing printing with the use of the print head, on the basis of the result of colorimetric process (S3) (Step S4). In the calibration process (S4), various parameters relating to printing are changed. Since various methods are known as the concrete treatment procedures, no description will be made here.

The present embodiment is characterized in that forced humidifying treatment (S2) is provided between the drying treatment (S1) and the colorimetry (S3). The printing medium 4 naturally absorbs moisture even if it stays in a humidity atmosphere of the ambient environment without providing any humidification unit, after the drying treatment (S1). However, the humidification treatment (S2) is performed on the basis of knowledge that as the moisture content of a printing medium approaches from an overdry state to the equilibrium state, the color of the printing medium is more stabilized. The present embodiment can reduce time taken for absorbing moisture, compared with natural absorption of moisture, thereby reducing time taken for stabilizing the color of the printing medium.

Figure 4:
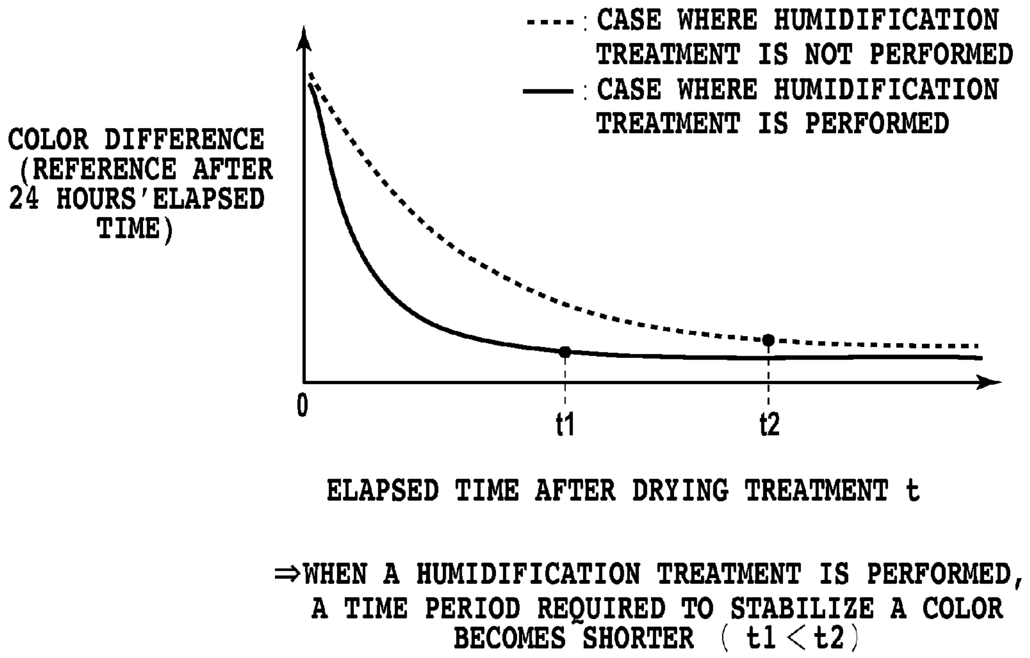
FIG. 4 is a schematic graph illustrating a color stabilization effect according to the present invention.

The effects of the present embodiment will be further described with reference to FIG. 4. FIG. 4 is a schematic graph of time periods taken for the color stabilization of the printing medium of an example and a comparative example, in which printing was performed in the same conditions in the both examples, but a humidification treatment (S2) is performed in the example and is not performed in the comparative example, after the drying treatment (S1). The color of the printing medium was measured at elapsed time t after the drying treatment (S1). In addition, the color of the printing medium was measured in 24 hours after the drying treatment (S1) and this color was set to the reference, and a color difference ($\Delta E$) between the reference and the measured value was obtained at the elapsed time t, using, for example, the CIELab system. In the graph, the horizontal axis indicates an elapsed time t, the vertical axis indicates a color difference $\Delta E$; and lines indicate data, a full line indicating an example in which the humidification treatment (S2) is performed, a dash line indicating a comparative example in which the humidification treatment (S2) is not performed. The graph shows that as a color difference approaches zero, the color of the printing medium becomes closer to the color at 24 hours' elapse and is stabilized.

In both of the case where humidification treatment (S2) is performed and the case where humidification treatment (S2) is not performed, the color difference becomes smaller as time passes, and the color of the printing medium is stabilized. However, time periods t1 and t2 required for stabilizing the color of the printing medium in the case where the humidification treatment (S2) is performed and in the case where the humidification treatment (S2) is not performed, respectively ($t1<t2<24$ hours) are apparently different in the graph. This shows that the humidification treatment (S2) can reduce time required for stabilizing the color of the printing medium.

As described above, the humidification treatment (S2) is performed so that the moisture content of the printing medium 4 in the overdry state becomes the equilibrium state. Therefore, in the humidification treatment unit 7, the humidity atmosphere of the humidification space is kept higher than that of the ambient environment and the printing medium 4 is made to stay within the humidification space for a time period in which the moisture content reaches the equilibrium state, thereby performing the humidification treatment (S2). The humidity condition and time condition at this time can depend on the ambient environment and can depend on each other.

In the humidification treatment (S2), after the printing medium 4 is carried into the humidification space, "a configuration in which the printing medium 4 is stopped while humidified in a predetermined time period" or "a configuration in which the printing medium 4 is carried in a predetermined speed while humidified" can be employed, as a method or configuration for making the printing medium 4 stay within the humidification space. Both the configurations will be described in detail below as second and third embodiments.

Second Embodiment

A second embodiment is an example that employs, as a configuration for making the printing medium 4 stay within the humidification space, "a configuration in which the printing medium 4 is stopped while humidified in a predetermined time period" after the printing medium 4 is carried into the humidification space. In this example, a configuration of the humidification treatment unit 7 will be described, assuming that other configuration is identical to the illustrative configuration of the inkjet printing apparatus according to the first embodiment (see FIGS. 1 and 2), in order to make explanation easier.

Figure 5A:
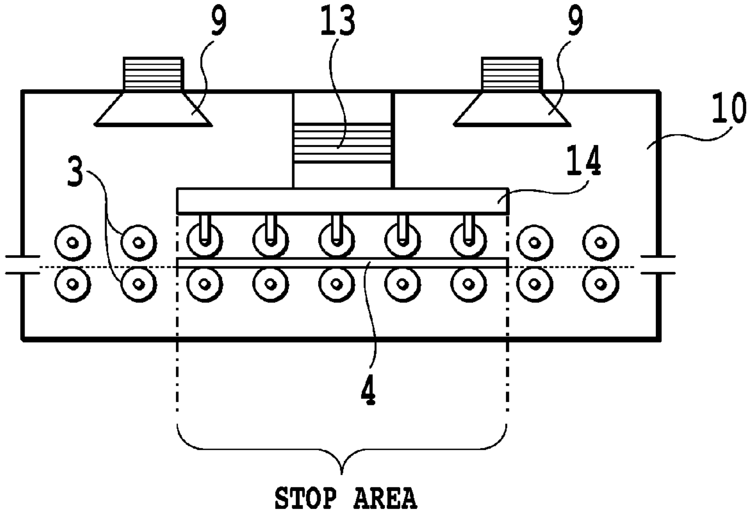
FIGS. 5A and 5B are schematic elevation views illustrating a configuration of a humidification treatment unit of an inkjet printing apparatus according to a second embodiment of the present invention.
Figure 5B:
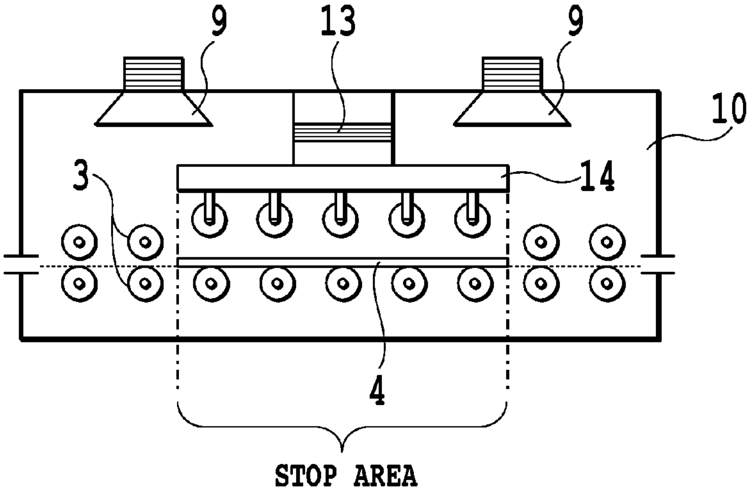

FIGS. 5A and 5B are schematic elevation views illustrating one example of a configuration of the humidification treatment unit 7 of the inkjet printing apparatus according to the second embodiment of the present invention. According to the second embodiment, the printing medium 4 is stopped within the chamber 10 of the humidification treatment unit 7 while humidified.

FIG. 5A illustrates a state where the printing medium 4 that was subject to the drying treatment (S1) is carried by the carrying rollers as the carrying mechanism 3 into and accommodated in the chamber 10 as the humidification space in the humidification treatment unit 7, and carrying by the carrying rollers is stopped. In this example, the upper and lower surfaces of the printing medium 4 are held between the carrying rollers immediately after it is carried into the chamber 10. If the humidification treatment (S2) proceeds while the printing medium 4 is stayed in this state, moisture absorption is inhibited at portions where the printing medium 4 contacts the carrying rollers for a treatment time. If the portions that contact the carrying rollers are a colorimetric surface on which an image was printed, there can be a problem, that is, when after a predetermined time, the printing medium 4 is carried out of the chamber 10 and the humidification treatment finishes, only the portions that contact the carrying rollers have a different color from other portions and the color rapidly changes. Accordingly, if the printing medium 4 is made to stay in a stationary state within the chamber 10, it is preferable to employ a configuration in which a component of the inkjet printing apparatus such as the carrying rollers does not contact, especially a calorimetric surface.

In order to realize such a configuration, according to the second embodiment, the humidification treatment unit 7 includes means for avoiding the contact of a component of the inkjet printing apparatus and a calorimetric surface of the printing medium 4 during the humidification treatment (S2). In this example, as such means, a mechanism for retracting the carrying rollers, that is, a carrying roller holder 14 and an extensible driving mechanism 13 connected thereto are provided, by way of example. The carrying roller holder 14 can hold the carrying rollers disposed on a colorimetric surface of the printing medium 4 stopped. The extensible driving mechanism 13 itself can extend or contract by a control mechanism (not shown) to raise or lower the carrying roller holder 14 connected thereto, thereby moving the carrying rollers held in the carrying roller holder 14 apart from the colorimetric surface or moving toward to contact the colorimetric surface again.

FIG. 5B illustrates a state where the contact of a component of the inkjet printing apparatus such as the carrying rollers and a calorimetric surface of the printing medium 4 is avoided, using the means according to the second embodiment. In an area where the printing medium 4 stays in a stationary state (in FIGS. 5A and 5B "stop area") within the chamber 10, the carrying rollers are temporally spaced apart from the printing medium 4 by the aforementioned means, thereby supporting the printing medium 4 only from the non-colorimetric surface (in FIGS. 5A and 5B the lower surface of the printing medium 4) of the printing medium 4. That is, according to the present embodiment, in a state where the printing medium 4 is stopped within the humidification space, the contact of the colorimetric surface of the printing medium 4 and the carrying means can be avoided.

Figure 6:
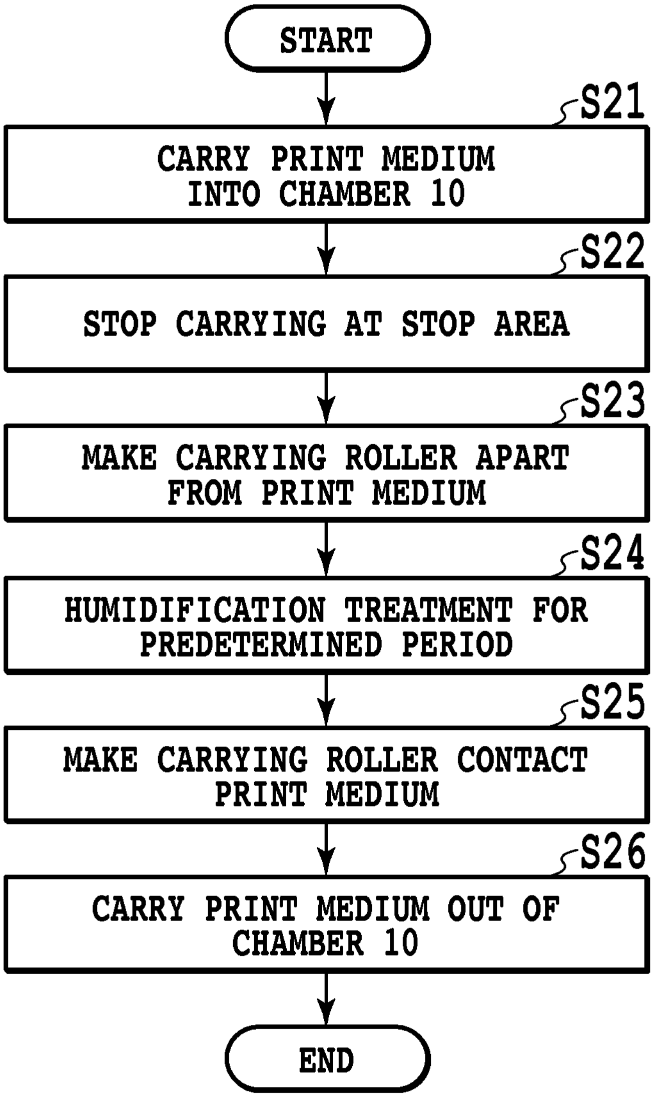
FIG. 6 is a flowchart illustrating a humidification treatment of a printing medium according to the second embodiment of the present invention.

FIG. 6 is a flow chart illustrating an example of operation of the humidification treatment (S2) of the inkjet printing apparatus according to the second embodiment. Operations of treatment and process before and after the humidification treatment (S2) in the inkjet printing apparatus (drying treatment S1 and colorimetry S3) are performed similar to those of the first embodiment. With reference to FIGS. 5A, 5B and 6, first, the printing medium 4 is carried into the chamber 10 as the humidification space in the humidification treatment unit 7 by the carrying rollers as the carrying means (Step 21: S21). When the printing medium 4 is carried to a predetermined position ("stop area" in FIG. 5A) within the chamber 10, carrying by the carrying rollers is stopped (Step 22: S22). Here, it is preferable that a predetermined position (stop area) in Step 22 is a position that allows for a uniform humidification treatment for the entire printing medium 4 and easily can control means for retracting the carrying rollers in the after-mentioned Steps 23 and 24. Until the end of Step 22, the carrying rollers contact the upper surface of the printing medium 4, that is, the colorimetric surface (FIG. 5A). Next, the carrying rollers contacting the colorimetric surface of the printing medium 4 are raised to a retracting position by carrying roller retracting means such as the extensible driving mechanism 13 connected to the carrying roller holder 14, thereby the carrying rollers being moved apart from the colorimetric surface of the printing medium 4 (Step 23: S23, FIG. 5B). In this state, the humidification treatment is performed for a predetermined time period (Step 24: S24). By making the printing medium 4 stay for a predetermined time period, moisture absorption of the printing medium 4 proceeds. Here, a predetermined time period is any time period that is set so that the moisture content of the printing medium 4 reaches the equilibrium state during a period from the time when the printing medium 4 is carried into the chamber 10 to the time when it is carried out of the chamber 10. The predetermined time period can depend on the humidity conditions of the ambient environment and within the chamber 10. When the predetermined time period has passed, the carrying roller retracting means finish the retracting state of the carrying rollers, thereby making the carrying rollers contact the colorimetric surface of the printing medium 4 again (Step 25: S25, FIG. 5A). Carrying by the carrying roller is restarted and the printing medium 4 is carried out of the chamber 10 (Step 26: S26).

As described above, according to the second embodiment, when the printing medium is disposed at the stop area within the humidification space of the humidification treatment unit, a component of the inkjet printing apparatus does not touch the colorimetric surface of the printing medium. This can reduce a difference of moisture absorption among portions of the surface of the printing medium, that is, a difference of stabilization of the color among them, due to partial inhibition of moisture absorption.

Third Embodiment

A third embodiment is an example that employs "a configuration in which the printing medium is carried in a predetermined speed while humidified", as a configuration for making the printing medium 4 stay within the humidification space, after the printing medium 4 is carried into the humidification space.

Returning to FIG. 2, the inkjet printing apparatus according to the third embodiment has the same configuration as that of the inkjet printing apparatus 1 according to the first embodiment. The third embodiment is characterized in that while the printing medium 4 is not stopped but carried within the chamber 10 of the humidification treatment unit 7, the humidification treatment (S2) is performed. The humidification treatment (S2) according to the third embodiment will be described in detail below.

The humidification treatment (S2) is performed in order to stabilize the color of the printing medium 4 that was subject to the drying treatment (S1), in a short time. Here, a state where the color of the printing medium 4 is "stabilized" means a state where the moisture content of the printing medium 4 reaches the equilibrium in the ambient environment. In order to stabilize the color of the printing medium 4 in a short time, conditions of the humidification treatment (S2) are set so that the moisture content of the printing medium 4 reaches the equilibrium state during a time period T between the time when the printing medium 4 is carried into the chamber 10 and the time when it is carried out of the chamber 10. It should be appreciated that since the conditions of the humidification treatment (S2) can depend on humidity and time conditions and so on of the ambient environment and treatment, it cannot be uniquely decided. However, a suitable carrying speed V can be preliminarily set on the basis of Ts and L, where Ts is a time period of the humidification treatment (S2) required to make the moisture content of the printing medium 4 reach a targeted state or to stabilize the color of the printing medium 4, and L is a distance in the carrying direction within the chamber 10. The carrying speed V may or may not be constant within the chamber. In this example, the printing medium 4 is carried at a constant speed Vs within the chamber, and the carrying speed is set to be Vs=L/Ts by way of example.

As described above, one of benefits of a configuration in which while the printing medium is not stopped but carried, the humidification treatment is performed is to reduce a difference of moisture content among portions of the surface of the printing medium, that is, a difference of color stabilization among them. For example, there is a case where there is a humidity distribution relative to the carrying direction of the printing medium within the chamber, due to the structure of the inkjet printing apparatus. In addition, as described above, there is a case where the carrying rollers that carry the printing medium or other components of the inkjet printing apparatus contact the surface of the printing medium to partially inhibit moisture absorption. In this case, there can be an unevenness of moisture absorption among portions of the surface of the printing medium, which is a problem. According to the present embodiment, as described above, the printing medium is carried through the chamber while being subject to the humidification treatment, thereby the embodiment equalizing conditions in which the printing medium is exposed to humidified air in respective portions in the carrying direction, especially, the humidity of the humidified air that contacts the colorimetric surface and its contact time period.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-113209, filed May 17, 2010, which is hereby incorporated by reference herein in its entirety.

What is claimed is:

1. An apparatus comprising:

a printing unit having an inkjet head configured to print an image on a surface of a printing medium;

a drying unit configured to dry the printing medium after the image is printed on the surface of the printing medium using the inkjet head;

a humidification unit configured to humidify the printing medium after the printing medium is dried by the drying unit, wherein the humidification unit includes a mechanism to separate a carrying component for carrying the printing medium from the surface of the printing medium on which the image is printed;

a colorimetric unit configured to perform colorimetry of the image on the surface of the printing medium after the printing medium is humidified by the humidification unit;

a calibration unit configured to calibrate printing properties for performing printing with the inkjet head, on the basis of the result of colorimetry by the colorimetric unit; and a control unit configured to control the humidification unit such that (i) the mechanism separates the carrying component from the surface of the printing medium, (ii) the printing medium is humidified for a predetermined time while the carrying component is separated from the surface of the printing medium, and (iii) the mechanism causes the carrying component to contact the surface of the printing medium after the printing medium is humidified.

2. The apparatus according to claim 1, wherein the humidification unit includes a space in which (i) the humidity is higher than in an ambient environment, and (ii) the moisture content of the printing medium can reach an equilibrium state with respect to the ambient environment.

3. The apparatus according to claim 2, wherein the control unit is further configured to control the apparatus such that the printing medium is dried by the drying unit, humidified by the humidification unit for a predetermined time period, and then subject to colorimetry by the colorimetric unit.

4. The apparatus according to claim 3, wherein the predetermined time period is a time period set in order that the humidification unit makes the moisture content of the printing medium reach the equilibrium state with respect to the ambient environment.

5. The apparatus according to claim 1, wherein the carrying component comprises a carrying roller to carry the printing medium.

6. A method of controlling an apparatus, comprising:

a drying treatment step of drying a printing medium having a surface on which an image is formed thereon;

a separation step of separating a carrying component from the surface of the printing medium, on which the image is formed, in a space provided for a humidifying treatment;

a humidification step of humidifying the printing medium subjected to drying in the drying treatment step while the carrying component is separated from the surface of the printing medium on which the image is formed;

a contact step of causing the carrying component to contact the surface of the printing medium after the printing medium is humidified in the humidification step; and a reading step of reading the image formed on the surface of the printing medium that was humidified in the humidification step, to obtain information for calibrating printing properties for performing printing.

7. The method according to claim 6, wherein an atmosphere in the space has a higher humidity than that of an ambient environment, and a moisture content of the printing medium can reach an equilibrium state with respect to the ambient environment within the space.

8. The method according to claim 7, wherein the humidifying treatment is performed for a predetermined time period set in order to make the moisture content of the printing medium reach the equilibrium state with respect to the ambient environment.

* * * * *